United States Patent
Yahata et al.

(10) Patent No.: US 12,480,928 B2
(45) Date of Patent: Nov. 25, 2025

(54) TOTAL ORGANIC CARBON MEASUREMENT METHOD AND TOTAL ORGANIC CARBON MEASUREMENT DEVICE

(71) Applicant: SHIMADZU CORPORATION, Kyoto (JP)

(72) Inventors: Masahito Yahata, Kyoto (JP); Yoshiaki Nieda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 709 days.

(21) Appl. No.: 17/777,417

(22) PCT Filed: Jun. 17, 2020

(86) PCT No.: PCT/JP2020/023673
§ 371 (c)(1),
(2) Date: May 17, 2022

(87) PCT Pub. No.: WO2021/100229
PCT Pub. Date: May 27, 2021

(65) Prior Publication Data
US 2023/0011100 A1   Jan. 12, 2023

(30) Foreign Application Priority Data
Nov. 18, 2019  (JP) .................... 2019-207919

(51) Int. Cl.
*G01N 33/18* (2006.01)
*G01N 27/06* (2006.01)
(Continued)

(52) U.S. Cl.
CPC ......... *G01N 33/1846* (2013.01); *G01N 27/06* (2013.01); *G01N 31/005* (2013.01); *G01N 31/12* (2013.01); *Y10T 436/235* (2015.01)

(58) Field of Classification Search
CPC ........... G01N 33/1846; G01N 33/0013; G01N 33/0014; G01N 33/004; G01N 31/12;
(Continued)

(56) References Cited

U.S. PATENT DOCUMENTS 5,567,388 A * 10/1996 Morita ............... G01N 33/1846
210/639
8,420,013 B1 * 4/2013 Inoue ................. G01N 33/1846
422/62
(Continued)

FOREIGN PATENT DOCUMENTS

CN   105738287 A   7/2016
CN   107186900 A   9/2017
(Continued)

OTHER PUBLICATIONS

Japanese Office Action dated Jan. 10, 2023 in Japanese Application No. 2021-558160.
(Continued)

*Primary Examiner* — Maureen Wallenhorst
(74) *Attorney, Agent, or Firm* — Sughrue Mion, PLLC

(57) ABSTRACT

Provided are a total organic carbon measurement method and a total organic carbon measurement device capable of determining whether or not an acid has been added to a sample. An acid is introduced into a reaction unit in which the sample is placed from a reservoir in which the acid is reserved (step S103). The conductivity of the sample into which the acid has been introduced is measured (step S105). The introduction of the acid from the reservoir into the reaction unit is detected on the basis of a change in the conductivity of the sample (step S107).

8 Claims, 7 Drawing Sheets

(51) Int. Cl.
*G01N 31/00* (2006.01)
*G01N 31/12* (2006.01)

(58) Field of Classification Search
CPC .. G01N 31/005; G01N 27/06; Y10T 436/235; Y10T 436/25125; Y10T 436/25375; Y10T 436/25875
USPC ....... 436/146, 149, 150, 155, 159, 160, 164, 436/175, 177, 181; 422/78, 80, 82.01, 422/82.02, 82.05, 83, 94
See application file for complete search history.

(56) References Cited

U.S. PATENT DOCUMENTS

| | | | |
|---|---|---|---|
| 2007/0254374 | A1 | 11/2007 | Iharada et al. |
| 2008/0220533 | A1* | 9/2008 | Fujiyama ........... G01N 33/1846 |
| | | | 422/82.02 |
| 2012/0039750 | A1* | 2/2012 | Yahata ............... G01N 33/1846 |
| | | | 422/80 |
| 2013/0172631 | A1* | 7/2013 | Warner ................ C07C 29/80 |
| | | | 568/884 |

FOREIGN PATENT DOCUMENTS

| | | |
|---|---|---|
| JP | 11-148906 A | 6/1999 |
| JP | 2006-084307 A | 3/2006 |
| JP | 2007-93209 A | 4/2007 |
| JP | 2007-263815 A | 10/2007 |
| JP | 2013-238426 A | 11/2013 |

OTHER PUBLICATIONS

Chinese Office Action issued Jul. 26, 2023 in Application No. 2020800772138.
Written Opinion for PCT/JP2020/023673, dated Sep. 8, 2020.
International Search Report for PCT/JP2020/023673, dated Sep. 8, 2020.
Extended European Search Report issued Nov. 21, 2023 in European Application No. 20890142.1.

* cited by examiner

TOTAL ORGANIC CARBON MEASUREMENT METHOD AND TOTAL ORGANIC CARBON MEASUREMENT DEVICE

TECHNICAL FIELD

The present invention relates to a total organic carbon measurement method and a total organic carbon measurement device.

BACKGROUND ART

In order to measure total organic carbon (TOC) contained in a sample, a total organic carbon measurement device is being used. The sample may contain inorganic carbon (IC) in addition to total organic carbon. TOC and IC are collectively referred to as total carbon (TC).

As an example of a method for measuring TOC, a method is known in which TC and IC are respectively measured, and the difference (TC-IC) therebetween is calculated as TOC (e.g., see Patent Document 1 below). TC is measured by detecting carbon dioxide generated when a sample is oxidized (combusted). On the other hand, IC is measured by detecting carbon dioxide generated when an acid is added to a sample and then the sample is aerated.

As another method for measuring TOC, a method is also known in which an acid is added to a sample and then the sample is aerated to convert IC into carbon dioxide and remove the IC, and carbon dioxide, generated when the sample with the IC removed therefrom is oxidized (combusted), is detected to measure TOC. In this method, purgeable organic carbon (POC) contained in the sample may also be lost at the same time when the IC is removed. Therefore, the TOC measured by this method is also called non-purgeable organic carbon (NPOC).

PRIOR ART DOCUMENT

Patent Document

Patent Document 1: Japanese Patent Application Laid-Open No. 2007-93209

SUMMARY OF THE INVENTION

Problems to be Solved by the Invention

As described above, at the time of measuring TOC, an acid is added to the sample in order to convert IC contained in the sample into carbon dioxide. However, the amount of the acid added to the sample is very small, and hence it is difficult to confirm whether the acid has been added normally. Conventionally, it has not been studied to determine whether or not an acid has been normally added to a sample, and there has been a possibility that measurement is performed in a state where the acid has not been added normally.

The present invention has been made in view of the above circumstances, and an object of the present invention is to provide a total organic carbon measurement method and a total organic carbon measurement device capable of determining whether or not an acid has been added to a sample.

Means for Solving the Problem

A first aspect of the present invention is a total organic carbon measurement method including: introducing an acid from a reservoir in which the acid is reserved into a reaction unit in which a sample is placed; measuring conductivity of the sample into which the acid is introduced; and detecting the introduction of the acid from the reservoir into the reaction unit on the basis of a change in the conductivity of the sample.

Effects of the Invention

According to the first aspect of the present invention, since the conductivity of the sample is measured after the introduction of the acid into the sample, it is possible to determine whether or not the acid has been added to the sample by detecting whether or not the acid has been introduced into the reaction unit from the reservoir on the basis of a change in the measured conductivity of the sample.

MODE FOR CARRYING OUT THE INVENTION

1. First Embodiment

Figure 1:
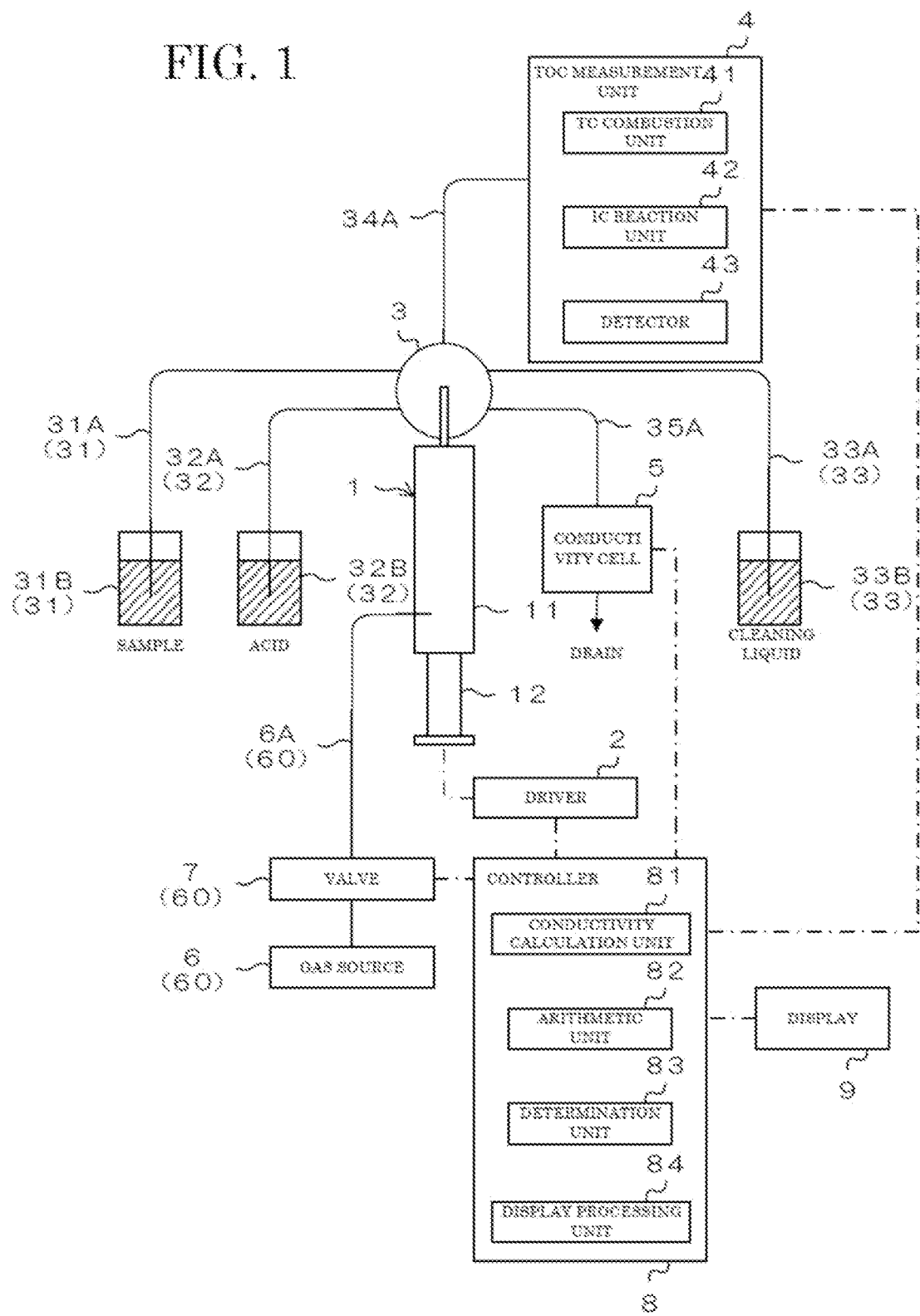
FIG. 1 is a schematic view illustrating a configuration example of a total organic carbon measurement device according to a first embodiment.

FIG. 1 is a schematic view illustrating a configuration example of a total organic carbon measurement device according to a first embodiment. The total organic carbon measurement device includes a syringe 1, a driver 2, a flow path switcher 3, a TOC measurement unit (total organic carbon measurement unit) 4, a conductivity cell 5, a gas source 6, a valve 7, a controller 8, a display 9, and the like.

The syringe 1 includes, for example, a cylindrical body 11 and a plunger 12. The plunger 12 has been inserted into the cylindrical body 11 and can collect liquid in the internal space of the syringe 1 surrounded by the inner surface of the cylindrical body 11 and the plunger 12. Specifically, by displacing the plunger 12 with respect to the cylindrical body 11, a suction operation of liquid to the syringe 1 and a discharge operation of liquid from the syringe 1 are performed. The plunger 12 is displaced by the drive of the driver 2 including, for example, a motor. The syringe 1 constitutes a reaction unit in which a sample is placed.

The syringe 1 is fluidly connected to the flow path switcher 3. The flow path switcher 3 includes, for example, a multi-port valve that can allow a plurality of ports to communicate arbitrarily. Pipes 31A, 32A, 33A, 34A, 35A are fluidly connected to the respective ports of the flow path switcher 3, and by switching the flow path switcher 3, any one of the pipes 31A, 32A, 33A, 34A, 35A can be allowed to communicate into the syringe 1.

When the suction operation by the syringe 1 is performed with the pipe 31A allowed to communicate with the syringe 1, from a sample reservoir 31B in which a sample to be analyzed is reserved, the sample is sucked into the syringe 1. When the suction operation by the syringe 1 is performed with the pipe 32A allowed to communicate with the syringe 1, from an acid reservoir (reservoir) 32B in which an acid is reserved, the acid is sucked into the syringe 1.

As described above, when the sample and the acid are sucked into the syringe 1, a mixed liquid of the sample and the acid can be generated in the syringe 1. As the acid, hydrochloric acid can be exemplified, but the acid is not limited thereto. The pipe 31A and the sample reservoir 31B constitute a sample supply unit 31 for supplying a sample. The pipe 32A and the acid reservoir 32B constitute an addition unit 32 that performs addition treatment for adding an acid to a sample by introducing the acid into the syringe 1. The amount of the acid added to the sample is, for example, 1 to 3 vol % with respect to the sample, but is not limited thereto.

When the suction operation by the syringe 1 is performed with the pipe 33A allowed to communicate with the syringe 1, from a cleaning liquid reservoir 33B in which a cleaning liquid is reserved, the cleaning liquid is sucked into the syringe 1. By performing the suction operation and the discharge operation of the cleaning liquid into the syringe 1, the inside of the syringe 1 and each unit communicating with the syringe 1 can be cleaned with the cleaning liquid. The cleaning liquid may be, for example, pure water or another liquid suitable for cleaning. The pipe 33A and the cleaning liquid reservoir 33B constitute a cleaning liquid supply unit 33 for supplying the cleaning liquid.

The pipe 34A fluidly connects the flow path switcher 3 and the TOC measurement unit 4. When the discharge operation by the syringe 1 is performed with the pipe 34A allowed to communicate with the syringe 1, the liquid in the syringe 1 is supplied to the TOC measurement unit 4 via the pipe 34A. For example, when the above discharge operation is performed after the sample is sucked into the syringe 1, the sample is supplied to the TOC measurement unit 4. When the discharge operation is performed after the sample and the acid are sucked into the syringe 1, the mixed liquid of the sample and the acid is supplied to the TOC measurement unit 4.

The TOC measurement unit (total organic carbon measurement unit) 4 includes a TC combustion unit 41, an IC reaction unit 42, and a detector 43. The TC combustion unit 41 combusts (oxidizes) TC included in the sample to generate carbon dioxide. The IC reaction unit 42 reacts the IC contained in the sample with the acid to generate carbon dioxide. The configurations of the TC combustion unit 41 and the IC reaction unit 42 are known, and thus, detailed description thereof will be omitted.

The detector 43 detects carbon dioxide generated in the TC combustion unit 41 or the IC reaction unit 42. The detector 43 can be formed of, for example, a nondispersive infrared sensor (NDIR sensor) but is not limited thereto. When the carbon dioxide generated in the TC combustion unit 41 is detected by the detector 43, TC contained in the sample can be measured. Further, when the carbon dioxide generated in the IC reaction unit 42 is detected by the detector 43, the IC contained in the sample can be measured. It is possible to calculate TOC on the basis of the TC and the IC thus measured and a relational expression TOC=TC−IC. Note that IC is an example of a carbon-based substance.

In the present embodiment, gas can be supplied from the gas source 6 into the syringe 1 via a pipe 6A communicating into the syringe 1. The pipe 6A communicates into the cylindrical body 11 of the syringe 1 in a state where the plunger 12 has been drawn out by a predetermined amount from the cylindrical body 11. The gas source 6 supplies an inert gas such as high-purity air or nitrogen gas. The valve 7 is interposed in the pipe 6A, and by opening the valve 7, the gas can be supplied from the gas source 6 into the syringe 1.

Therefore, when the acid is added to the sample in the syringe 1 (addition treatment), and then the gas is supplied from the gas source 6 into the syringe 1 in a state where the plunger 12 has been drawn out by the predetermined amount, bubbles can be generated in the mixed liquid of the sample and the acid to perform aeration treatment. By the aeration treatment, the IC contained in the sample reacts with the acid, and carbon dioxide as a carbon-based substance in a gas phase is generated. The mixed liquid after the aeration treatment is in a state where the IC has been removed. Therefore, when the mixed liquid after the aeration treatment is supplied to the TOC measurement unit 4 and combusted by the TC combustion unit 41, and the generated carbon dioxide is detected by the detector 43, the TOC can be measured directly. The gas source 6, the pipe 6A, and the valve 7 constitute a remover 60 that generates carbon dioxide from the sample after the addition treatment to remove the IC in the sample.

In the present embodiment, it is possible to perform processing of detecting carbon dioxide generated by the aeration treatment by the detector 43, or processing of generating carbon dioxide by the TC combustion unit 41 after the aeration treatment and detecting the generated carbon dioxide by the detector 43, on the sample (the mixed liquid of the sample and the acid) after the addition treatment. Since the IC in the sample after the addition treatment is removed by performing the aeration treatment on the sample, when the sample is supplied to the TC combustion unit 41 after the removal of the IC, carbon dioxide generated by oxidizing the sample with the IC removed therefrom is detected by the detector 43.

The pipe 35A communicates with a drain via the conductivity cell 5. The conductivity cell 5 has a pair of electrodes (not illustrated). The liquid drained to the drain via the pipe 35A passes between the pair of electrodes in the conductivity cell 5. By allowing an alternating current to flow through the pair of electrodes and measuring electrical resistance between the pair of electrodes, the reciprocal of the measured electrical resistance can be calculated as the conductivity of the liquid.

The controller 8 includes, for example, a processor including a central processing unit (CPU). By the processor executing a computer program, the controller 8 functions as a conductivity calculation unit 81, an arithmetic unit 82, a determination unit 83, a display processing unit 84, and the like. The driver 2, the TOC measurement unit 4, the conductivity cell 5, the valve 7, the display 9, and the like are electrically connected to the controller 8. The controller 8 is not limited to a controller formed of one processor, and at least one of the conductivity calculation unit 81, the arithmetic unit 82, the determination unit 83, and the display processing unit 84 may be formed of another processor.

The conductivity calculation unit 81 calculates the conductivity of the liquid passing through the conductivity cell 5 on the basis of an input signal from the conductivity cell 5. For example, when the sample and the acid are sucked into the syringe 1, and then the mixed liquid of the sample and the acid is supplied from the syringe 1 to the conductivity cell 5, the conductivity calculation unit 81 calculates the conductivity of the sample after the addition treatment on the basis of the input signal from the conductivity cell 5. In this case, the conductivity cell 5 and the conductivity calculation unit 81 function as a first conductivity measurement unit that measures the conductivity of the sample after the addition treatment. The measurement of the conductivity of the sample after the addition treatment is performed, for example, by calculating an average value of the conductivity within a predetermined time after the addition treatment. However, instead of the average value, the conductivity acquired at a predetermined timing after the addition treatment may be used as it is as the measurement result of the conductivity.

When only the sample is sucked into the syringe 1 and the sample is supplied from the syringe 1 to the conductivity cell 5, the conductivity calculation unit 81 calculates the conductivity of the sample before the addition treatment on the basis of the input signal from the conductivity cell 5. In this case, the conductivity cell 5 and the conductivity calculation unit 81 function as a second conductivity measurement unit that measures the conductivity of the sample before the addition treatment. The measurement of the conductivity of the sample before the addition treatment is performed, for example, by calculating an average value of the conductivity within a predetermined time before the addition treatment. However, instead of the average value, the conductivity acquired at a predetermined timing before the addition treatment may be used as it is as the measurement result of the conductivity.

The arithmetic unit 82 performs a calculation on the basis of the conductivity calculated by the conductivity calculation unit 81. Specifically, the arithmetic unit 82 performs processing of calculating a difference in the conductivity of the sample before and after the addition treatment. When an acid is added to the sample, the conductivity of the sample increases rapidly. For example, when the conductivity of each of various liquids was measured, the conductivity of pure water was 1.717 μS/cm, and the conductivity of tap water was 125.0 μS/cm, whereas the conductivity of a mixed liquid obtained by adding a hydrochloric acid aqueous solution to tap water was 5650 μS/cm. Therefore, when the acid has been normally added to the sample, the difference obtained by subtracting the conductivity of the sample before the addition treatment from the conductivity of the sample after the addition treatment is a larger value than a case where the acid has not been added normally to the sample. The arithmetic unit 82 also performs a calculation of subtracting the amount of the carbon-based substance (IC) in the gas phase from the amount of total carbon (TC).

The determination unit 83 determines whether or not the acid has been added to the sample on the basis of the difference in conductivity calculated by the conductivity calculation unit 81. Specifically, the determination unit 83 performs processing of comparing the difference in conductivity calculated by the conductivity calculation unit 81 with a predetermined threshold. Then, when the difference in conductivity is equal to or greater than the threshold, it is determined that the acid has been added normally to the sample, and when the difference in conductivity is less than the threshold, it is determined that the acid has not been added normally to the sample. In this manner, the determination unit 83 can determine that the acid has been introduced into the syringe 1 from the acid reservoir 32B on the basis of the change in the conductivity of the sample. Although it is also possible to determine whether or not the acid has been added to the sample by using a pH sensor instead of measuring the conductivity of the sample, there is a problem that the pH sensor is expensive and cannot perform accurate measurement when the amount of the sample is small.

The display processing unit 84 controls the operation of the display 9. The display 9 includes, for example, a liquid crystal display or the like. The display processing unit 84 can cause the display 9 to display a result of the determination by the determination unit 83 and the like in addition to a result of the measurement of the TOC by the TOC measurement unit 4.

2. TOC Measurement Method

Figure 2:
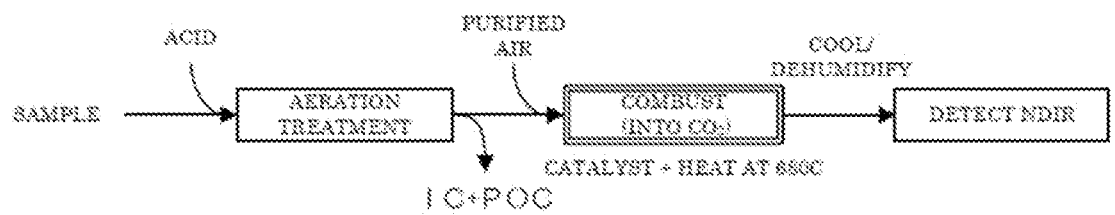
FIG. 2 is a diagram for explaining an example of a TOC measurement method.

FIG. 2 is a diagram for explaining an example of a TOC measurement method. In this example, a description will be given of a case where the above-described aeration treatment is performed on the sample to which the acid has been added in the syringe 1 to directly measure the TOC.

When bubbles are generated in the mixed liquid of the sample and the acid and the aeration treatment is performed, the IC in the sample is converted into carbon dioxide and removed. At this time, POC contained in the sample is also removed simultaneously. The mixed liquid after the aeration treatment is supplied to the TOC measurement unit 4 by the operations of the syringe 1 and the flow path switcher 3 and is oxidized by being combusted in the TC combustion unit 41.

The TC combustion unit 41 includes a combustion tube (not illustrated) filled with a catalyst such as platinum. While the mixed liquid is heated at a high temperature of, for example, 680° C. in the combustion tube, purified air is supplied into the combustion tube. Thereby, TC in the sample is converted into carbon dioxide. The carbon dioxide generated in the TC combustion unit 41 is cooled and dehumidified, and then detected by the NDIR detector 43.

As described above, the IC in the sample has been removed in advance in the syringe 1. Thus, all the carbon dioxide generated in the TC combustion unit 41 is converted from TOC. Therefore, the TOC can be directly measured by the detector 43 detecting the carbon dioxide generated in the TC combustion unit 41.

Figure 3:
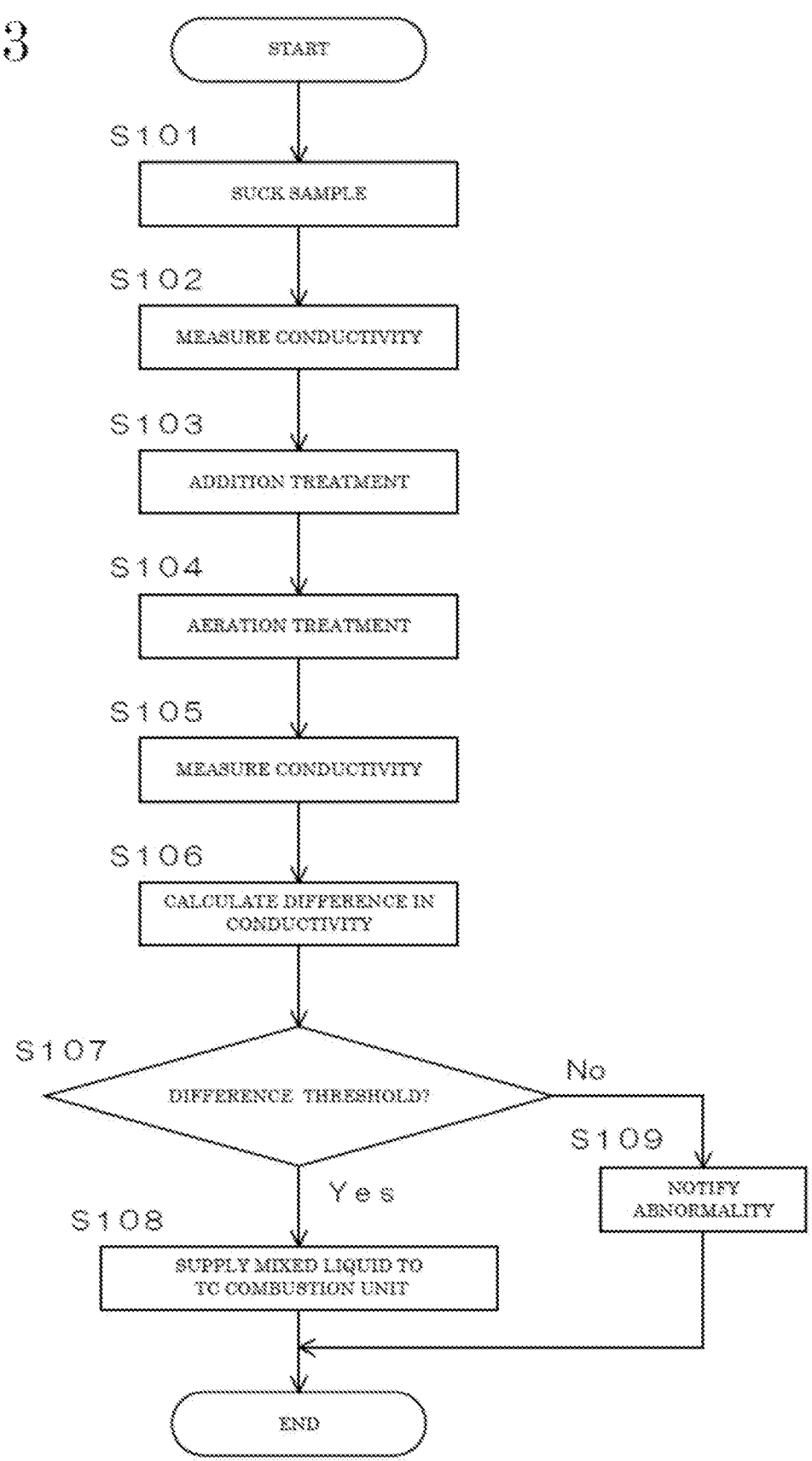
FIG. 3 is a flowchart illustrating an example of processing by a controller at the time of measuring TOC.

FIG. 3 is a flowchart illustrating an example of processing by the controller 8 at the time of measuring TOC. At the time of measuring the TOC in the sample, first, the controller 8 controls the driver 2 and the flow path switcher 3 so as to suck the sample into the syringe 1 (step S101: sample suction step).

Thereafter, the controller 8 controls the flow path switcher 3 so that the syringe 1 communicates with the conductivity cell 5. Then, the controller 8 controls the driver 2 so as to push the plunger 12 of the syringe 1 into the cylindrical body 11 by a predetermined amount, whereby a part of the sample before the addition treatment is supplied to the conductivity cell 5. At this time, the conductivity calculation unit 81 calculates the conductivity of the sample on the basis of the input signal from the conductivity cell 5, thereby measuring the conductivity of the sample before the addition treatment (step S102: second conductivity measurement step).

In this state, the sample sucked in step S101 remains in the syringe 1. The controller 8 controls the driver 2 and the flow path switcher 3 again so as to perform addition treatment for adding an acid to the sample in the syringe 1 (step S103: addition step). Then, the controller 8 performs the aeration treatment by controlling the valve 7 so as to supply the gas from the gas source 6 into the syringe 1 and generate bubbles in the mixed liquid of the sample and the acid (step S104: aeration step). Accordingly, carbon dioxide is generated from the sample after the addition treatment, and the IC in the sample is removed.

Thereafter, the controller 8 controls the flow path switcher 3 so that the syringe 1 communicates with the conductivity cell 5. Then, the controller 8 controls the driver 2 so as to push the plunger 12 of the syringe 1 into the cylindrical body 11 by a predetermined amount, whereby a part of the sample after the addition treatment is supplied to the conductivity cell 5. At this time, the conductivity calculation unit 81 calculates the conductivity of the sample on the basis of the input signal from the conductivity cell 5, thereby measuring the conductivity of the sample after the addition treatment (step S105: first conductivity measurement step).

The arithmetic unit 82 of the controller 8 calculates a difference in the measured conductivity of the sample before and after the addition treatment (step S106: calculation step). That is, the arithmetic unit 82 performs a calculation of subtracting the conductivity of the sample before the addition treatment measured in step S102 from the conductivity of the sample after the addition treatment measured in step S105.

The determination unit 83 of the controller 8 compares the difference in conductivity calculated in step S106 with a threshold (step S107: determination step). That is, the determination unit 83 detects that the acid has been introduced into the syringe 1 from the acid reservoir 32B on the basis of the change in the conductivity of the sample. As a result, when the difference in conductivity is equal to or larger than the threshold (Yes in step S107), the controller 8 controls the driver 2 and the flow path switcher 3 so as to supply the mixed liquid in the syringe 1 to the TC combustion unit 41, and carbon dioxide generated in the TC combustion unit 41 is detected by the detector 43 (step S108: detection step). In this case, the remover 60, the TC combustion unit 41, and the detector 43 constitute a carbon-based substance measurement unit.

At this time, at least a part of the remaining sample in the syringe 1 after the supply of a part the sample to the conductivity cell 5 is supplied to the TC combustion unit 41. That is, the entire remaining sample in the syringe 1 may be supplied to the TC combustion unit 41, or only a part of the remaining sample in the syringe 1 may be supplied to the TC combustion unit 41.

On the other hand, as a result of the determination by the determination unit 83, when the difference in conductivity is less than the threshold (No in step S107), the display processing unit 84 controls the display 9 so that the display 9 displays the occurrence of an abnormality (step S109: notification step). The abnormality notification may be, for example, content for notifying that the acid has not been added normally to the sample. At this time, the supply of the mixed liquid to the TC combustion unit 41 may be stopped, or the abnormality notification may be performed in parallel with the supply of the mixed liquid to the TC combustion unit 41.

3. Modification of TOC Measurement Method

Figure 4:
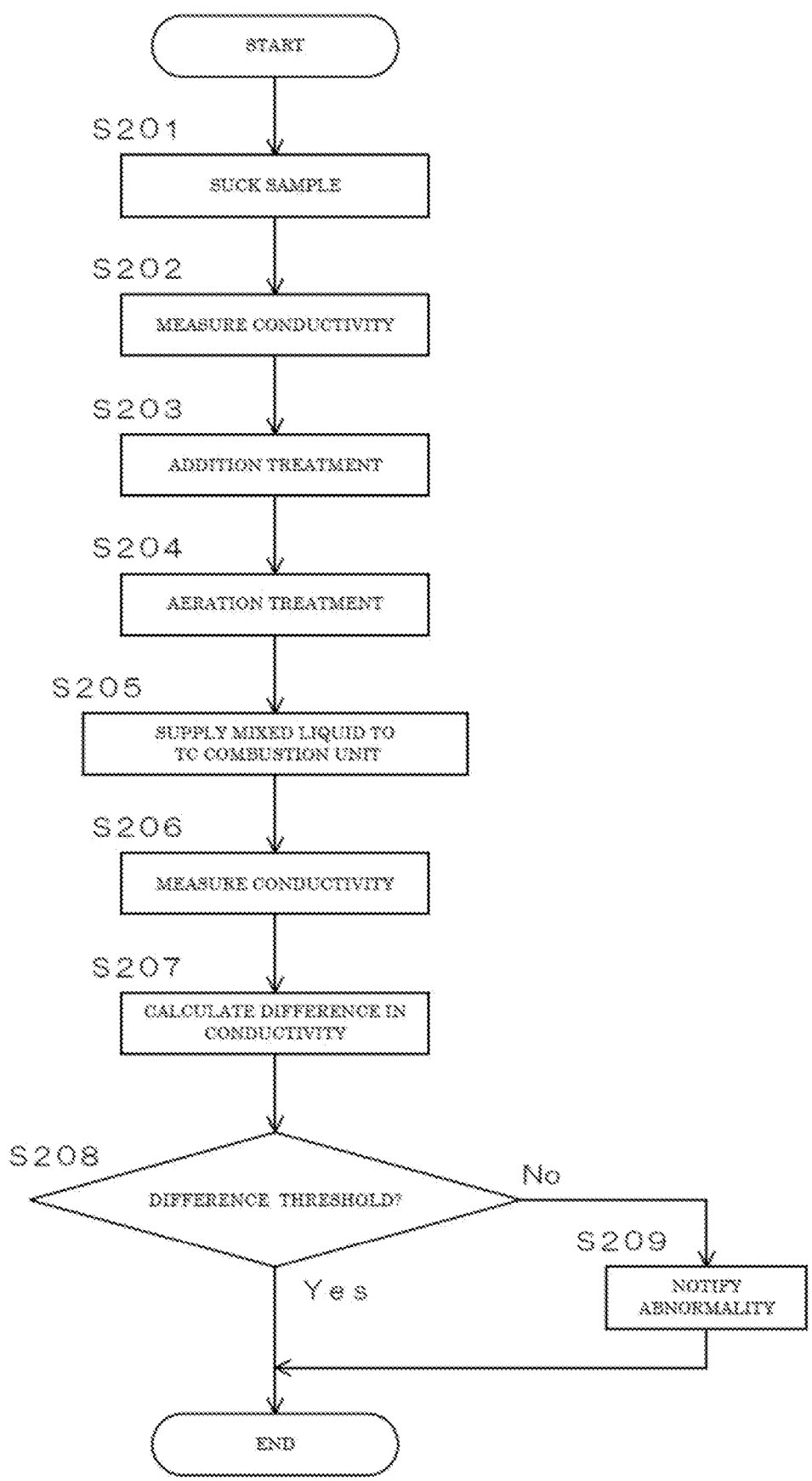
FIG. 4 is a flowchart illustrating a modification of the processing by the controller at the time of measuring TOC.

FIG. 4 is a flowchart illustrating a modification of the processing by the controller 8 at the time of measuring TOC. In the modification, the order of the processing of measuring the conductivity of the mixed liquid and the processing of supplying the mixed liquid to the TC combustion unit 41 is different from that of the above embodiment, but the other processing is the same as that of the above embodiment.

At the time of measuring the TOC in the sample, first, the controller 8 controls the driver 2 and the flow path switcher 3 so as to suck the sample into the syringe 1 (step S201: sample suction step). Thereafter, the controller 8 controls the flow path switcher 3 so that the syringe 1 communicates with the conductivity cell 5. Then, the controller 8 controls the driver 2 so as to push the plunger 12 of the syringe 1 into the cylindrical body 11 by a predetermined amount, whereby a part of the sample before the addition treatment is supplied to the conductivity cell 5. At this time, the conductivity calculation unit 81 calculates the conductivity of the sample on the basis of the input signal from the conductivity cell 5, thereby measuring the conductivity of the sample before the addition treatment (step S202: second conductivity measurement step).

In this state, the sample sucked in step S201 remains in the syringe 1. The controller 8 controls the driver 2 and the flow path switcher 3 again so as to perform addition treatment for adding an acid to the sample in the syringe 1 (step S203: addition step). Then, the controller 8 performs the aeration treatment by controlling the valve 7 so as to supply the gas from the gas source 6 into the syringe 1 and generate bubbles in the mixed liquid of the sample and the acid (step S204: aeration step). Accordingly, carbon dioxide is generated from the sample after the addition treatment, and the IC in the sample is removed.

After the aeration treatment, the controller 8 controls the driver 2 and the flow path switcher 3 so as to supply the mixed liquid in the syringe 1 to the TC combustion unit 41, and carbon dioxide generated in the TC combustion unit 41 is detected by the detector 43 (step S205: detection step). At this time, a part of the sample in the syringe 1 is supplied to the TC combustion unit 41. In this case, the remover 60, the TC combustion unit 41, and the detector 43 constitute a carbon-based substance measurement unit.

Thereafter, the controller 8 controls the flow path switcher 3 so that the syringe 1 communicates with the conductivity cell 5. Then, the controller 8 controls the driver 2 so as to push the plunger 12 of the syringe 1 into the cylindrical body 11 by a predetermined amount. Thereby, at least a part of the remaining sample in the syringe 1 after the supply of a part the sample to the TC combustion unit 41 is supplied to the conductivity cell 5. At this time, the conductivity calculation unit 81 calculates the conductivity of the sample on the basis of the input signal from the conductivity cell 5, thereby measuring the conductivity of the sample after the addition treatment (step S206: first conductivity measurement step).

The arithmetic unit 82 of the controller 8 calculates a difference in the measured conductivity of the sample before and after the addition treatment (step S207: calculation step). That is, the arithmetic unit 82 performs a calculation of subtracting the conductivity of the sample before the addition treatment measured in step S202 from the conductivity of the sample after the addition treatment measured in step S206.

The determination unit 83 of the controller 8 compares the difference in conductivity calculated in step S207 with a threshold (step S208: determination step). That is, the determination unit 83 detects that the acid has been introduced into the syringe 1 from the acid reservoir 32B on the basis of the change in the conductivity of the sample. As a result, when the difference in conductivity is equal to or larger than the threshold (Yes in step S208), the processing ends as it is. On the other hand, when the difference in conductivity is less than the threshold (No in step S208), the display processing unit 84 controls the display 9 so that the display 9 displays the occurrence of an abnormality (step S209: notification step). The abnormality notification may be, for example, content for notifying that the acid has not been added normally to the sample.

4. Second Embodiment

The configuration of the total organic carbon measurement device according to the second embodiment is similar to the configuration of the total organic carbon measurement device according to the first embodiment illustrated in FIG. 1. The second embodiment is different from the first embodiment in that the sample after the addition treatment (the mixed liquid of sample and acid) is not supplied to the TC combustion unit 41 after the aeration treatment, but carbon dioxide generated by the aeration treatment is supplied to the detector 43.

Figure 5A:
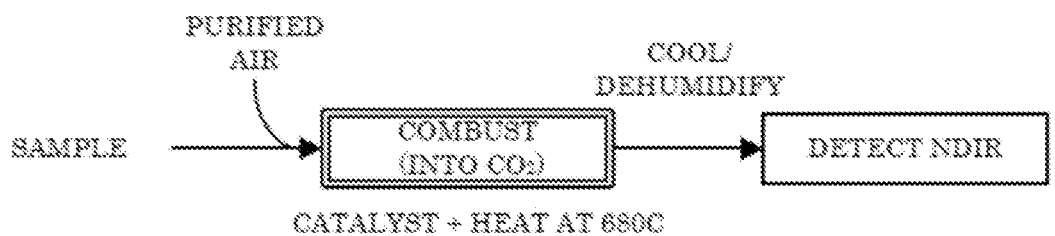
FIG. 5A is a diagram for explaining an example of a TOC measurement method and illustrates an example of a TC measurement method.
Figure 5B:
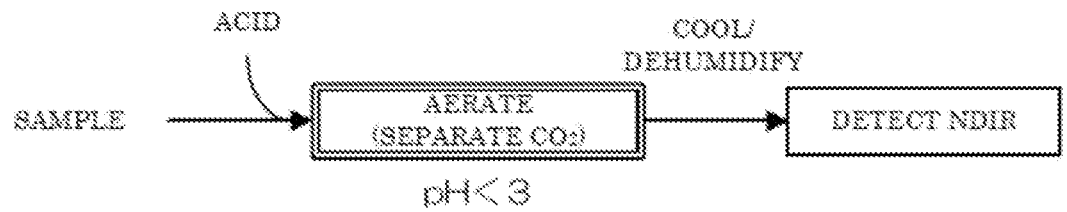
FIG. 5B is a diagram for explaining an example of the TOC measurement method and illustrates an example of an IC measurement method.

FIGS. 5A and 5B are diagrams for explaining an example of the TOC measurement method. FIG. 5A illustrates an example of a TC measurement method, and FIG. 5B illustrates an example of an IC measurement method.

At the time of measuring the TC in the sample, after the sample is sucked into the syringe 1 by the operation of the syringe 1 and the flow path switcher 3, the sample is supplied to the TC combustion unit 41 and combusted in the TC combustion unit 41 to be oxidized. At this time, as illustrated in FIG. 5A, in the combustion tube of the TC combustion unit 41 filled with the catalyst, purified air is supplied into the combustion tube while the sample is heated at a high temperature of, for example, 680° C. Thereby, TC in the sample is converted into carbon dioxide. The carbon dioxide generated in the TC combustion unit 41 is cooled and dehumidified, and then detected by the NDIR detector 43.

At the time of measuring the IC in the sample, the sample and the acid are sucked into the syringe 1 by the operation of the syringe 1 and the flow path switcher 3 to generate a mixed liquid. At this time, as illustrated in FIG. 5B, bubbles are generated in the mixed liquid in the syringe 1, whereby the aeration treatment is performed. The pH of the mixed liquid is, for example, less than 3. The IC in the sample is converted into carbon dioxide by the aeration treatment. The carbon dioxide separated from the mixed liquid in the syringe 1 is cooled and dehumidified, and then detected by the NDIR detector 43.

Figure 6:
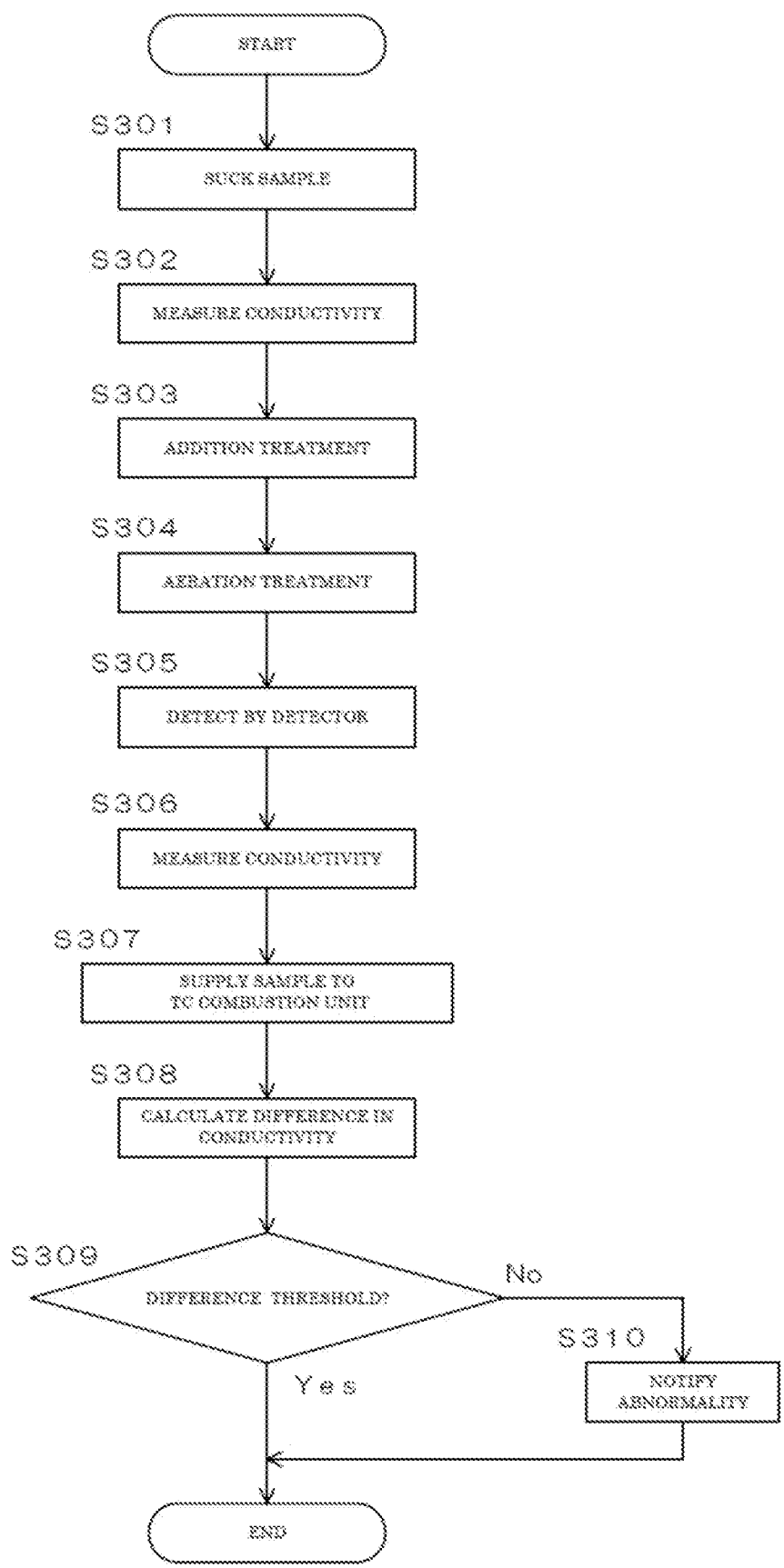
FIG. 6 is a flowchart illustrating an example of processing by the controller at the time of measuring TOC.

The TOC is calculated on the basis of the TC and IC thus measured and the relational expression TOC=TC−IC. FIG. 6 is a flowchart illustrating an example of processing by the controller 8 at the time of measuring TOC.

At the time of measuring the TOC in the sample, first, the controller 8 controls the driver 2 and the flow path switcher 3 so as to suck the sample into the syringe 1 (step S301: sample suction step). Thereafter, the controller 8 controls the flow path switcher 3 so that the syringe 1 communicates with the conductivity cell 5. Then, the controller 8 controls the driver 2 so as to push the plunger 12 of the syringe 1 into the cylindrical body 11 by a predetermined amount, whereby a part of the sample before the addition treatment is supplied to the conductivity cell 5. At this time, the conductivity calculation unit 81 calculates the conductivity of the sample on the basis of the input signal from the conductivity cell 5, thereby measuring the conductivity of the sample before the addition treatment (step S302: second conductivity measurement step).

In this state, the sample sucked in step S301 remains in the syringe 1. The controller 8 controls the driver 2 and the flow path switcher 3 again so as to perform addition treatment for adding an acid to the sample in the syringe 1 (step S303: addition step).

Thereafter, the controller 8 performs the aeration treatment by controlling the valve 7 so as to supply the gas from the gas source 6 into the syringe 1 and generate bubbles in the mixed liquid of the sample and the acid (step S304: aeration step). Thereby, carbon dioxide is generated from the sample after the addition treatment, and the generated carbon dioxide is detected by the detector 43 (step S305). In this case, the remover 60 and the detector 43 constitute a carbon-based substance measurement unit.

After the aeration treatment, the controller 8 controls the flow path switcher 3 so that the syringe 1 communicates with the conductivity cell 5. Then, the controller 8 controls the driver 2 so as to push the plunger 12 of the syringe 1 into the cylindrical body 11 by a predetermined amount. Thereby, at least a part of the sample in the syringe 1 is supplied to the conductivity cell 5. At this time, the conductivity calculation unit 81 calculates the conductivity of the sample on the basis of the input signal from the conductivity cell 5, thereby measuring the conductivity of the sample after the addition treatment (step S306: first conductivity measurement step). Thereafter, the controller 8 controls the driver 2 and the flow path switcher 3 so as to discharge the mixed liquid in the syringe 1, suck the sample again, and supply the sample in the syringe 1 to the TC combustion unit 41, whereby the carbon dioxide generated in the TC combustion unit 41 is detected by the detector 43 (step S307). In this case, the TC combustion unit 41 and the detector 43 constitute a total carbon measurement unit.

The arithmetic unit 82 of the controller 8 calculates a difference in the measured conductivity of the sample before and after the addition treatment (step S308: calculation step). That is, the arithmetic unit 82 performs a calculation of subtracting the conductivity of the sample before the addition treatment measured in step S302 from the conductivity of the sample after the addition treatment measured in step S306.

The determination unit 83 of the controller 8 compares the difference in conductivity calculated in step S308 with a threshold (step S309: determination step). That is, the determination unit 83 detects that the acid has been introduced into the syringe 1 from the acid reservoir 32B on the basis of the change in the conductivity of the sample. As a result, when the difference in conductivity is equal to or larger than the threshold (Yes in step S309), the processing ends as it is. On the other hand, when the difference in conductivity is less than the threshold (No in step S309), the display processing unit 84 controls the display 9 so that the display 9 displays the occurrence of an abnormality (step S310: notification step). The abnormality notification may be, for example, content for notifying that the acid has not been added normally to the sample.

5. Modification of TOC Measurement Method of Second Embodiment

Figure 7:
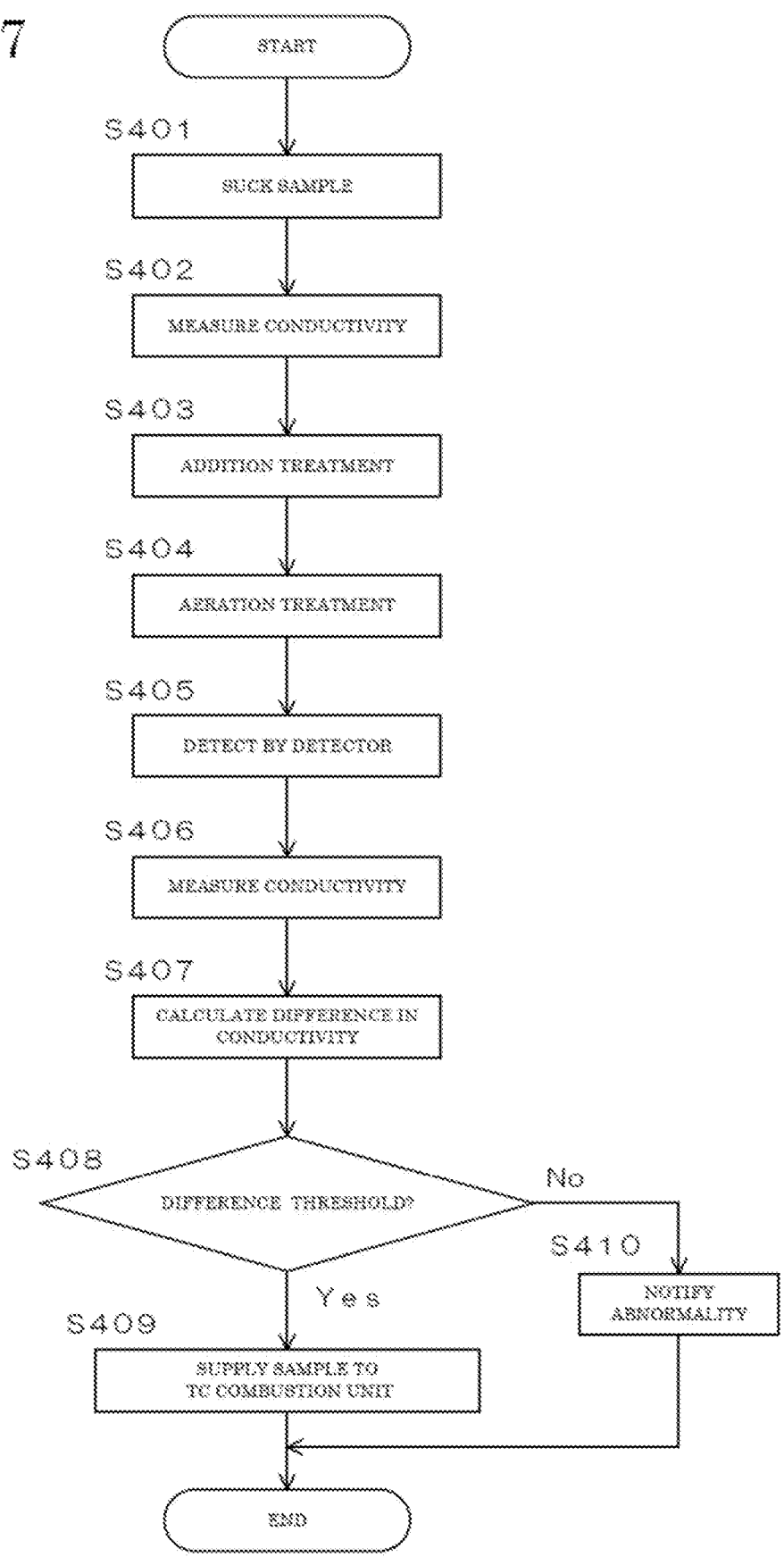
FIG. 7 is a flowchart illustrating a modification of the processing by the controller at the time of measuring TOC.

FIG. 7 is a flowchart illustrating a modification of the processing by the controller 8 at the time of measuring TOC. In the modification, the order of the processing of comparing the difference in conductivity with the threshold and the processing of supplying the mixed liquid to the TC combustion unit 41 is different from that of the second embodiment, but the other processing is the same as that of the above embodiment.

At the time of measuring the TOC in the sample, first, the controller 8 controls the driver 2 and the flow path switcher 3 so as to suck the sample into the syringe 1 (step S401: sample suction step). Thereafter, the controller 8 controls the flow path switcher 3 so that the syringe 1 communicates with the conductivity cell 5. Then, the controller 8 controls the driver 2 so as to push the plunger 12 of the syringe 1 into the cylindrical body 11 by a predetermined amount, whereby a part of the sample before the addition treatment is supplied to the conductivity cell 5. At this time, the conductivity calculation unit 81 calculates the conductivity of the sample on the basis of the input signal from the conductivity cell 5, thereby measuring the conductivity of the sample before the addition treatment (step S402: second conductivity measurement step).

In this state, the sample sucked in step S401 remains in the syringe 1. The controller 8 controls the driver 2 and the flow path switcher 3 again so as to perform addition treatment for adding an acid to the sample in the syringe 1 (step S403: addition step). Thereafter, the controller 8 performs the aeration treatment by controlling the valve 7 so as to supply the gas from the gas source 6 into the syringe 1 and generate bubbles in the mixed liquid of the sample and the acid (step S404: aeration step). Thereby, carbon dioxide is generated from the sample after the addition treatment, and the generated carbon dioxide is detected by the detector 43 (step S405). In this case, the remover 60 and the detector 43 constitute a carbon-based substance measurement unit.

Thereafter, the controller 8 controls the flow path switcher 3 so that the syringe 1 communicates with the conductivity cell 5. Then, the controller 8 controls the driver 2 so as to push the plunger 12 of the syringe 1 into the cylindrical body 11 by a predetermined amount. Thereby, at least a part of the sample in the syringe 1 is supplied to the conductivity cell 5. At this time, the conductivity calculation unit 81 calculates the conductivity of the sample on the basis of the input signal from the conductivity cell 5, thereby measuring the conductivity of the sample after the addition treatment (step S406: first conductivity measurement step).

The arithmetic unit 82 of the controller 8 calculates a difference in the measured conductivity of the sample before and after the addition treatment (step S407: calculation step). That is, the arithmetic unit 82 performs a calculation of subtracting the conductivity of the sample before the addition treatment measured in step S402 from the conductivity of the sample after the addition treatment measured in step S406.

The determination unit 83 of the controller 8 compares the difference in conductivity calculated in step S407 with a threshold (step S408: determination step). That is, the determination unit 83 detects that the acid has been introduced into the syringe 1 from the acid reservoir 32B on the basis of the change in the conductivity of the sample. As a result, when the difference in conductivity is equal to or larger than the threshold (Yes in step S408), the controller 8 controls the driver 2 and the flow path switcher 3 so as to discharge the mixed liquid in the syringe 1, suck the sample again, and supply the sample in the syringe 1 to the TC combustion unit 41, whereby carbon dioxide generated in the TC combustion unit 41 is detected by the detector 43 (step S409). In this case, the TC combustion unit 41 and the detector 43 constitute a total carbon measurement unit.

On the other hand, as a result of the determination by the determination unit 83, when the difference in conductivity is less than the threshold (No in step S408), the display processing unit 84 controls the display 9 so that the display 9 displays the occurrence of an abnormality (step S410: notification step). The abnormality notification may be, for example, content for notifying that the acid has not been added normally to the sample.

6. Other Modifications

A plurality of thresholds may be provided stepwise for use when the determination unit 83 determines whether or not the acid has been added to the sample. In this case, a different notification may be performed for each of the plurality of thresholds. For example, when the difference in conductivity of the sample before and after the addition treatment is less than a first threshold, it may be notified that there is no acid in the acid reservoir 32B, and when the difference is equal to or greater than the first threshold and less than a second threshold, it may be notified that there is a failure in the flow path switcher 3.

The abnormality notification based on the determination result of the determination unit 83 is not limited to display on the display 9 but may be performed by other modes such as voice.

In the above embodiment, the configuration has been described in which the difference in the conductivity of the sample before and after the addition treatment is calculated, and the difference is compared with the threshold to determine whether or not the acid has been added to the sample. However, the present invention is not limited to such a configuration, and a configuration may be adopted in which whether or not the acid has been added to the sample is determined by comparing the conductivity of the sample after the addition treatment with a threshold. In this case, the processing of measuring the conductivity of the sample before the addition treatment may be omitted.

In the above embodiment, the configuration has been described in which the TOC can be calculated on the basis of the relational expression TOC=TC−IC, and the TOC can be directly measured by the detector 43 detecting carbon dioxide generated from the mixed liquid after the aeration treatment. However, the present invention is not limited to such a configuration, and a TOC measurement device capable of measuring the TOC only by any one of the methods may be used.

In the processing by the controller 8 illustrated in FIGS. 3, 4, 6, and 7, at least one step may be manually performed by the user. A configuration may be adopted in which the aeration treatment is performed after the determination unit 83 determines whether or not the acid has been added to the sample. However, the treatment of removing the IC in the sample is not limited to the aeration treatment but may be other treatment such as treatment of circulating the sample after the addition treatment in a gas-permeable tube, for example.

In the above embodiment, the TOC measurement device of the combustion catalyst oxidation system has been described, but a TOC measurement device of a wet oxidation system may be used. That is, the present invention is not limited to the configuration in which the TC contained in the sample is combusted by the TC combustion unit 41 to be oxidized, and for example, a configuration in which the TC contained in the sample is oxidized using an oxidizing agent such as sodium peroxydisulfate may be adopted.

6. Aspects

It is understood by those skilled in the art that the plurality of exemplary embodiments described above are specific examples of the following aspects.

(Section 1) A total organic carbon measurement method according to one aspect may include:
  introducing an acid from a reservoir in which the acid is reserved into a reaction unit in which a sample is placed;
  measuring conductivity of the sample into which the acid is introduced; and
  detecting the introduction of the acid from the reservoir into the reaction unit on a basis of a change in the conductivity of the sample.

According to the total organic carbon measurement method described in Section 1, since the conductivity of the sample is measured after the introduction of the acid into the sample, whether or not the acid has been added to the sample can be determined by detecting whether or not the acid has been introduced into the reaction unit from the reservoir on the basis of the change in the measured conductivity of the sample.

(Section 2) The total organic carbon measurement method described in Section 1 may further include:
  measuring an amount of total carbon contained in the sample;
  measuring an amount of a carbon-based substance in a gas phase generated by performing aeration treatment on the sample after the introduction of the acid; and
  subtracting the amount of the carbon-based substance in the gas phase from the amount of the total carbon.

According to the total organic carbon measurement method described in Section 2, the total organic carbon can be measured by subtracting the amount of the carbon-based substance in the gas phase from the amount of the total carbon.

(Section 3) The total organic carbon measurement method described in Section 1 may further include combusting the sample after the introduction of the acid and after aeration treatment, and measuring an amount of a generated carbon-based substance in a gas phase.

According to the total organic carbon measurement method described in Section 3, since inorganic carbon in the sample is removed in advance by the aeration treatment, the total organic carbon can be directly measured by combusting the sample after the aeration treatment and measuring the amount of the generated carbon-based substance in the gas phase.

(Section 4) In the total organic carbon measurement method described in Section 3,
  in the step of measuring conductivity of the sample into which the acid is introduced, a part of the sample into which the acid is introduced may be supplied to a conductivity measurement unit, and conductivity of the sample supplied to the conductivity measurement unit may be measured, and
  in the step of measuring an amount of a carbon-based substance in a gas phase, an amount of a carbon-based substance in a gas phase generated from at least a part of a remaining sample after the supply of a part of the sample to the conductivity measurement unit may be measured.

According to the total organic carbon measurement method described in Section 4, in order to measure the conductivity of the sample into which the acid has been introduced, after a part of the sample into which the acid has been introduced is supplied to the conductivity measurement unit, the remaining sample is used to measure the amount of the carbon-based substance in the gas phase generated from at least a part of the remaining sample, so that the total organic carbon can be measured.

(Section 5) In the total organic carbon measurement method described in Section 3,
  in the step of measuring an amount of a carbon-based substance in a gas phase, a part of the sample into which the acid is introduced may be supplied to a carbon-based substance measurement unit, and an amount of a carbon-based substance in a gas phase generated from the sample supplied to the carbon-based substance measurement unit may be measured, and
  in the step of measuring conductivity of the sample into which the acid is introduced, conductivity of at least a part of a remaining sample after the supply of a part of the sample to the carbon-based substance measurement unit may be measured.

According to the total organic carbon measurement method described in Section 5, after a part of the sample into which the acid has been introduced is supplied to the carbon-based substance measurement unit, the remaining sample is used, so that the conductivity of at least a part of the remaining sample can be measured.

(Section 6) The total organic carbon measurement method described in Section 1 may further include:
  measuring conductivity of the sample before the acid is introduced; and
  calculating a difference in the conductivity of the sample before and after the introduction of the acid.

According to the total organic carbon measurement method described in Section 6, the conductivity of the sample is measured even before the introduction of the acid, and the difference in the conductivity of the sample before and after the introduction of the acid is calculated, so that whether or not the acid has been added to the sample can be determined on the basis of the calculated difference.

(Section 7) A total organic carbon measurement device according to one aspect may include:
  a reaction unit in which a sample is placed;
  an addition unit configured to introduce an acid into the reaction unit from a reservoir in which the acid is reserved;
  a first conductivity measurement unit that measures conductivity of the sample into which the acid is introduced; and
  a determination unit that determines the introduction of the acid from the reservoir into the reaction unit on a basis of a change in the conductivity of the sample.

According to the total organic carbon measurement device described in Section 7, since the conductivity of the sample is measured after the introduction of the acid into the sample, whether or not the acid has been added to the sample can be determined by detecting whether or not the acid has been introduced into the reaction unit from the reservoir on the basis of the change in the measured conductivity of the sample.

(Section 8) The total organic carbon measurement device described in Section 7 may further include:
  a total carbon measurement unit that measures an amount of total carbon contained in the sample;
  a carbon-based substance measurement unit that measures an amount of a carbon-based substance in a gas phase generated by performing aeration treatment on the sample after the introduction of the acid; and
  an arithmetic unit that subtracts the amount of the carbon-based substance in the gas phase from the amount of the total carbon.

According to the total organic carbon measurement device described in Section 8, the total organic carbon can be measured by subtracting the amount of the carbon-based substance in the gas phase from the amount of the total carbon.

(Section 9) The total organic carbon measurement device described in Section 7 may further include a carbon-based substance measurement unit that combusts the sample after the introduction of the acid and after aeration treatment, and measures an amount of a generated carbon-based substance in a gas phase.

According to the total organic carbon measurement device described in Section 9, since inorganic carbon in the sample is removed in advance by the aeration treatment, the total organic carbon can be directly measured by combusting the sample after the aeration treatment and measuring the amount of the generated carbon-based substance in the gas phase.

(Section 10) In the total organic carbon measurement device described in Section 9,
a part of the sample into which the acid is introduced may be supplied to the first conductivity measurement unit, and
the carbon-based substance measurement unit may measure an amount of a carbon-based substance in a gas phase generated from at least a part of a remaining sample after the supply of a part of the sample to the first conductivity measurement unit.

According to the total organic carbon measurement device described in Section 10, in order to measure the conductivity of the sample into which the acid has been introduced, after a part of the sample into which the acid has been introduced is supplied to the first conductivity measurement unit, the remaining sample is used to measure the amount of the carbon-based substance in the gas phase generated from at least a part of the remaining sample, so that the total organic carbon can be measured.

(Section 11) In the total organic carbon measurement device described in Section 9,
a part of the sample into which the acid is introduced may be supplied to the carbon-based substance measurement unit, and
the first conductivity measurement unit may measure conductivity of at least a part of a remaining sample after the supply of a part of the sample to the carbon-based substance measurement unit.

According to the total organic carbon measurement device described in Section 11, after a part of the sample into which the acid has been introduced is supplied to the carbon-based substance measurement unit, the remaining sample is used, so that the conductivity of at least a part of the remaining sample can be measured.

(Section 12) The total organic carbon measurement device described in Section 5 may further include:
a second conductivity measurement unit that measures conductivity of the sample before the introduction of the acid; and
an arithmetic unit that calculates a difference in the conductivity of the sample before and after the introduction of the acid.

According to the total organic carbon measurement device described in Section 12, the conductivity of the sample is measured even before the introduction of the acid, and the difference in the conductivity of the sample before and after the introduction of the acid is calculated, so that whether or not the acid has been added to the sample can be determined on the basis of the calculated difference.

DESCRIPTION OF REFERENCE SIGNS 1 syringe
2 driver
3 flow path switcher
4 TOC measurement unit
5 conductivity cell
6 gas source
7 valve
8 controller
9 display
31 sample supply unit
32 addition unit
33 cleaning liquid supply unit
41 TC combustion unit
42 IC reaction unit
43 detector
60 remover
81 conductivity calculation unit
82 arithmetic unit
83 determination unit
84 display processing unit

The invention claimed is:
1. A total organic-carbon measurement method comprising:
introducing an acid from a reservoir in which the acid is reserved into a reaction unit in which a sample is placed;
measuring conductivity of the sample before the acid is introduced:
measuring conductivity of the sample into which the acid is introduced;
calculating a difference in the conductivity of the sample before and after the introduction of the acid;
detecting the introduction of the acid from the reservoir into the reaction unit on a basis of the difference in the conductivity of the sample; and
combusting the sample after the introduction of the acid and after aeration treatment, and measuring an amount of a generated carbon-based substance in a gas phase to obtain the total organic carbon in the sample.

2. The total organic-carbon measurement method according to claim 1, wherein
in the step of measuring conductivity of the sample into which the acid is introduced, a part of the sample into which the acid is introduced is supplied to a conductivity measurement unit, and conductivity of the sample supplied to the conductivity measurement unit is measured, and
in the step of measuring an amount of a carbon-based substance in the gas phase, an amount of a carbon-based substance in a gas phase generated from at least a part of a remaining sample after the supply of a part of the sample to the conductivity measurement unit is measured.

3. A total organic carbon measurement comprising:
introducing an acid from a reservoir in which the acid is reserved into a reaction unit in which a sample is placed;
measuring conductivity of the sample before the acid is introduced;
measuring conductivity of the sample into which the acid is introduced;
calculating a difference in the conductivity of the sample before and after the introduction of the acid;

detecting the introduction of the acid from the reservoir into the reaction unit on a basis of the difference in the conductivity of the sample;

measuring an amount of total carbon contained in the sample by combusting the sample before the introduction of the acid and measuring an amount of a generated carbon-based substance in a gas phase;

measuring an amount of a carbon-based substance in a gas phase generated by performing aeration treatment on the sample after the introduction of the acid; and subtracting the amount of the carbon-based substance in the gas phase after aeration treatment from the amount of the total carbon to obtain the total organic carbon in the sample.

4. The total organic-carbon measurement method according to claim 3, wherein in the step of measuring an amount of a carbon-based substance in a gas phase after aeration treatment, a part of the sample into which the acid is introduced is supplied to a carbon-based substance measurement unit, and an amount of a carbon-based substance in a gas phase generated from the sample supplied to the carbon-based substance measurement unit is measured, and in the step of measuring conductivity of the sample into which the acid is introduced, conductivity of at least a part of a remaining sample after the supply of a part of the sample to the carbon-based substance measurement unit is measured.

5. A total organic-carbon measurement device, comprising:

a reaction unit in which a sample is placed;

an addition unit configured to introduce an acid into the reaction unit from a reservoir in which the acid is reserved;

a first conductivity measurement unit that measures conductivity of the sample into which the acid is introduced;

a second conductivity measurement unit that measures conductivity of the sample before the introduction of the acid;

and an arithmetic unit that calculates a difference in the conductivity of the sample before and after the introduction of the acid; and a determination unit that determines the introduction of the acid from the reservoir into the reaction unit on a basis of the difference in the conductivity of the sample; and a carbon-based substance measurement unit that combusts the sample after the introduction of the acid and after aeration treatment, and measures an amount of a generated carbon-based substance in a gas phase to obtain the total organic carbon in the sample.

6. The total organic-carbon measurement device according to claim 5, wherein a part of the sample into which the acid is introduced is supplied to the first conductivity measurement unit, and the carbon-based substance measurement unit measures an amount of a carbon-based substance in a gas phase generated from at least a part of a remaining sample after the supply of a part of the sample to the first conductivity measurement unit.

7. The total organic-carbon measurement device according to claim 5, wherein a part of the sample into which the acid is introduced is supplied to the carbon-based substance measurement unit, and the first conductivity measurement unit measures conductivity of at least a part of a remaining sample after the supply of a part of the sample to the carbon-based substance measurement unit.

8. A total organic carbon measurement device, comprising:

a reaction unit in which a sample is placed;

an addition unit configured to introduce an acid into the reaction unit from a reservoir in which the acid is reserved;

a first conductivity measurement unit that measures conductivity of the sample into which the acid is introduced;

a second conductivity measurement unit that measures conductivity of the sample before the introduction of the acid; and an arithmetic unit that calculates a difference in the conductivity of the sample before and after the introduction of the acid;

characterized in that the total organic carbon measurement device further comprises:

a determination unit that determines the introduction of the acid from the reservoir into the reaction unit on a basis of the difference in the conductivity of the sample;

a total carbon measurement unit that measures an amount of total carbon contained in the sample by combusting the sample before the introduction of the acid and measuring an amount of a generated carbon-based substance in a gas phase; and a carbon-based substance measurement unit that measures an amount of a carbon-based substance in a gas phase generated by performing aeration treatment on the sample after the introduction of the acid;

wherein the arithmetic unit subtracts the amount of the carbon-based substance in the gas phase after aeration treatment from the amount of the total carbon to obtain the total organic carbon in the sample.

\* \* \* \* \*